United States Patent
Satrijo et al.

(10) Patent No.: US 10,626,268 B2
(45) Date of Patent: Apr. 21, 2020

(54) PRESSURE SENSITIVE ADHESIVE FOAMS AND ARTICLES THEREFROM

(71) Applicant: 3M INNOVATIVE PROPERTIES COMPANY, St. Paul, MN (US)

(72) Inventors: Andrew Satrijo, St. Paul, MN (US); Kyle P. Erickson, St. Paul, MN (US); Jingjing Ma, Cottage Grove, MN (US); Damian A. Marshall, Apple Valley, MN (US); Richard L. Peloquin, Maplewood, MN (US); Sharon Wang, St. Paul, MN (US); Michael C. Martin, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/391,426

(22) PCT Filed: Apr. 12, 2013

(86) PCT No.: PCT/US2013/036266
§ 371 (c)(1),
(2) Date: Oct. 9, 2014

(87) PCT Pub. No.: WO2013/155536
PCT Pub. Date: Oct. 17, 2013

(65) Prior Publication Data
US 2015/0030839 A1    Jan. 29, 2015

Related U.S. Application Data

(60) Provisional application No. 61/623,986, filed on Apr. 13, 2012.

(51) Int. Cl.
*C08L 53/00* (2006.01)
*C09J 133/08* (2006.01)
(Continued)

(52) U.S. Cl.
CPC ............. *C08L 53/00* (2013.01); *C08J 9/0061* (2013.01); *C09J 7/10* (2018.01); *C09J 7/381* (2018.01);
(Continued)

(58) Field of Classification Search
CPC . Y10T 428/249983; C08J 9/0061; C08J 9/16; C08J 2207/02; C08J 2333/08;
(Continued)

(56) References Cited

U.S. PATENT DOCUMENTS 3,906,027 A    9/1975  Meussdoerffer et al.
4,167,639 A    9/1979  Billenstein et al.
(Continued)

FOREIGN PATENT DOCUMENTS

JP    2000-073025    3/2000
JP    2000-351952    12/2000
(Continued)

OTHER PUBLICATIONS

Gregory et al. "Styrene Isoprene Butadiene Styrene Block Copolymers Improve PSA Label Adhesive Performance" published on Jan. 10, 2007 on ASI—https://www.adhesivesmag.com/articles/86753-styrene-isoprene-butadiene-sibs-block-copolymers-improve-psa-label-adhesive-performance (Year: 2007).*

(Continued)

*Primary Examiner* — Frank J Vineis
*Assistant Examiner* — Laura B Figg
(74) *Attorney, Agent, or Firm* — Steven A. Bern; Dena M. Ehrich

(57) ABSTRACT

There is provided a pressure sensitive adhesive foam comprising a foam comprising a non-syntactic foam blend of styrenic block copolymer and acrylic copolymer wherein the pressure-sensitive adhesive foam has an elongation of greater than 600%, wherein the non-syntactic foam blend is (Continued)

a hot melt formed foam. There is also provided multilayer pressure sensitive adhesive foams, pressure sensitive adhesive foam tapes and articles made using such pressure sensitive adhesive foam.

18 Claims, 2 Drawing Sheets

(51) Int. Cl.
*C09J 153/02* (2006.01)
*C08J 9/00* (2006.01)
*C09J 7/38* (2018.01)
*C09J 7/10* (2018.01)

(52) U.S. Cl.
CPC ............. *C09J 7/385* (2018.01); *C09J 7/387* (2018.01); *C09J 133/08* (2013.01); *C09J 153/02* (2013.01); *C08G 2170/20* (2013.01); *C08J 2207/02* (2013.01); *C08J 2333/08* (2013.01); *C08J 2353/02* (2013.01); *C08J 2433/08* (2013.01); *C08J 2453/02* (2013.01); *C09J 2201/606* (2013.01); *C09J 2203/30* (2013.01); *C09J 2400/24* (2013.01); *C09J 2425/00* (2013.01); *C09J 2433/00* (2013.01); *Y10T 428/249983* (2015.04)

(58) Field of Classification Search
CPC ............. C08J 2353/02; C08J 2433/08; C08J 2453/02; C08L 53/00; C09J 133/08; C09J 153/02; C09J 5/08; C09J 7/10; C09J 7/381; C09J 7/385; C09J 7/387; C09J 2201/606; C09J 2203/30; C09J 2400/24; C09J 2425/00; C09J 2433/00; C08G 2170/20
USPC ......................................................... 428/220
See application file for complete search history.

(56) References Cited

U.S. PATENT DOCUMENTS

| | | | |
|---|---|---|---|
| 4,181,752 A | 1/1980 | Martens | |
| 4,529,740 A | 7/1985 | Trainor | |
| 5,024,880 A * | 6/1991 | Veasley | C09J 133/08 428/317.5 |
| 5,342,986 A | 8/1994 | Pohmer et al. | |
| 5,502,251 A | 3/1996 | Pohmer et al. | |
| 5,516,581 A * | 5/1996 | Kreckel | A47G 1/175 428/317.3 |
| 5,851,617 A * | 12/1998 | Keiser | C09J 7/26 428/41.8 |
| 6,169,138 B1 * | 1/2001 | Petit | C08J 9/32 524/500 |
| 6,268,046 B1 * | 7/2001 | Miller | C08J 9/0061 428/220 |
| 6,461,725 B1 * | 10/2002 | Kanada | B29C 44/3446 428/317.1 |
| 6,503,621 B1 | 1/2003 | Ma et al. | |
| 6,586,482 B2 | 7/2003 | Gehlsen et al. | |
| 6,630,531 B1 | 10/2003 | Khandpur et al. | |
| 6,638,985 B2 | 10/2003 | Gehlsen et al. | |
| 6,664,354 B2 | 12/2003 | Savu et al. | |
| 7,612,121 B2 | 11/2009 | Mino | |
| 8,802,777 B2 | 8/2014 | Zöllner et al. | |
| 2002/0128336 A1 * | 9/2002 | Kolb | C08J 9/0066 521/50 |
| 2003/0170443 A1 * | 9/2003 | Kobe | C09J 7/29 428/317.3 |
| 2004/0241417 A1 | 12/2004 | Fischer et al. | |
| 2005/0032447 A1 * | 2/2005 | Tachibana | B32B 5/24 442/149 |
| 2007/0077418 A1 | 4/2007 | Sakurai et al. | |
| 2008/0160293 A1 | 7/2008 | Arimitsu et al. | |
| 2012/0004335 A1 | 1/2012 | Hamer et al. | |

FOREIGN PATENT DOCUMENTS

| | | |
|---|---|---|
| WO | WO 1994/013750 | 6/1994 |
| WO | WO 96/25469 | 8/1996 |
| WO | WO 97/23577 | 7/1997 |

OTHER PUBLICATIONS

PCT International Search Report for PCT/US2013/036266 dated Jun. 20, 2013, 3 pages.
Pocius, A.V., Adhesion & Adhesives Technology: An Introduction, Hanser Publishers New York NY, First Edition, 1997.

* cited by examiner

PRESSURE SENSITIVE ADHESIVE FOAMS AND ARTICLES THEREFROM

FIELD

The present disclosure relates to thin pressure sensitive adhesive (PSA) foams. The present disclosure further provides PSA's having hot melt foam blends of styrenic block copolymers and acrylic copolymers.

BACKGROUND

There is a current trend in various markets, such as for example mobile handheld electronics, displays, and the like, towards thinner products. Conventional foam tapes are typically relatively thick. Thinner foam tapes are prepared using hollow microspheres, which result in the creation of syntactic foams, which have compressability and conformability that are generally less than those of similar materials foamed by blowing agents. The enhanced compressability and conformability of gas-blown thin foams may contribute to greater impact resistance when subjected to a compressive force. There exists a need for a thin, gas-blown pressure sensitive adhesive foam, a multilayer pressure sensitive adhesive foam, and a pressure sensitive adhesive foam tape that provides greater impact resistance when subjected to compressive forces.

SUMMARY

The present disclosure provides a thin, hot-melt pressure sensitive adhesive foam, a multilayer pressure sensitive adhesive foam, and a pressure sensitive adhesive foam tape that provide greater impact resistance when subjected to compressive and tensile forces.

Thus, in one aspect, the present disclosure provides a pressure sensitive adhesive foam comprising a foam comprising a non-syntactic foam blend of styrenic block copolymer and acrylic copolymer wherein the pressure-sensitive adhesive foam has an elongation of greater than 600%, wherein the non-syntactic foam blend is a hot melt formed foam. In some embodiments, the presently disclosed pressure sensitive adhesive foam further comprises a total thickness of less than 0.51 mm (25 mils).

In some embodiments, the non-syntactic foam blend has a density of greater than 0.6 g/cm$^3$. In some embodiments, the non-syntactic foam blend has a density of greater than 0.7 g/cm$^3$. In some embodiments, the foam is a halogen-free foam containing substantially no halogen compound by design. In some embodiments, the pressure sensitive adhesive foam further comprises a color additive.

In another aspect, the present disclosure provides a multilayer pressure sensitive adhesive foam comprising the presently disclosed pressure sensitive adhesive foam and further comprising at least one pressure sensitive adhesive layer on a first major surface of the foam. In some embodiments, the multilayer pressure sensitive adhesive foam further comprises a second pressure sensitive adhesive layer on a second major surface of the foam opposite the first major surface of the foam.

In another aspect, the present disclosure provides a pressure sensitive adhesive foam tape comprising the presently disclosed pressure sensitive adhesive foam or presently disclosed multilayer pressure sensitive adhesive foam and further comprises a backing layer. In some embodiments, each pressure sensitive adhesive layer is independently selected from a pressure sensitive adhesive comprising at least one of an acrylic co-polymer, a styrenic block copolymer, and blends thereof.

In some embodiments, the presently disclosed multi layer pressure sensitive adhesive foam or pressure sensitive adhesive foam tape further comprises a tackifier. In some embodiments, the pressure sensitive adhesive layers further comprises a color additive. In some embodiments, the color additive is a black color additive.

In another aspect, the present disclosure provides an article comprising at least one of the presently disclosed pressure sensitive adhesive foam, multilayer pressure sensitive adhesive foam, or pressure sensitive adhesive foam tape.

Various aspects and advantages of exemplary embodiments of the present disclosure have been summarized. The above Summary is not intended to describe each illustrated embodiment or every implementation of the present disclosure. Further features and advantages are disclosed in the embodiments that follow. The Drawings and the Detailed Description that follow more particularly exemplify certain embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which.

Figure 1:
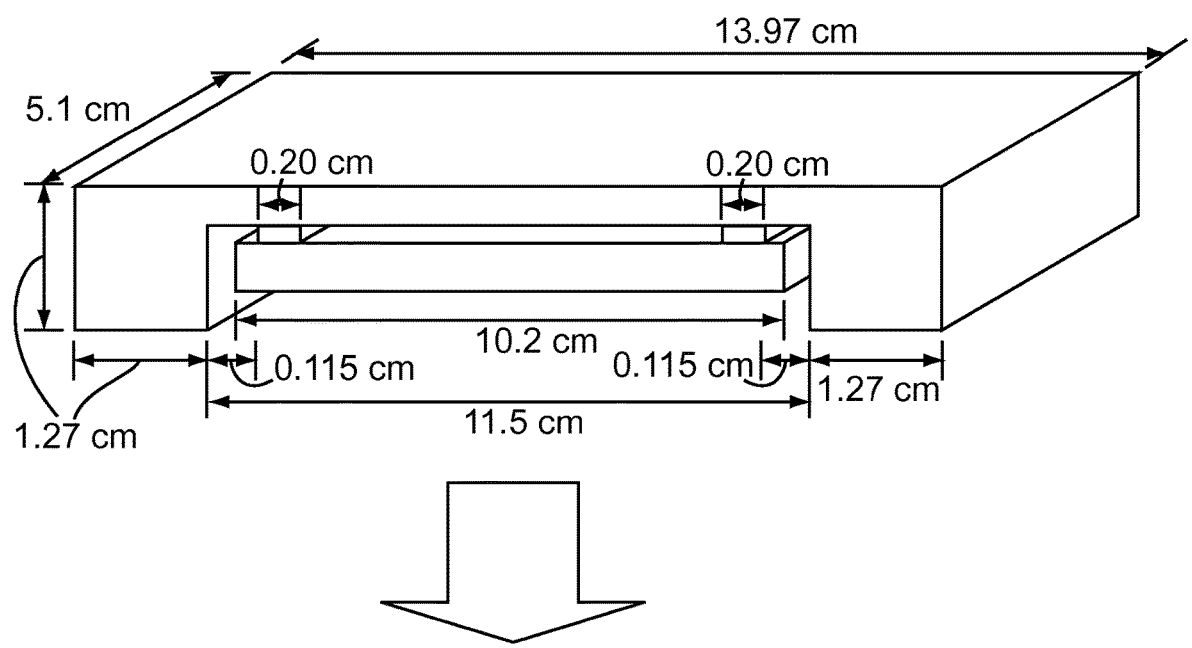
FIG. 1 is a front perspective view of a test panel made according to the present disclosure for testing tensile drop resistance.

While the above-identified drawings, which may not be drawn to scale, set forth various embodiments of the present disclosure, other embodiments are also contemplated, as noted in the Detailed Description. In all cases, this disclosure describes the presently disclosed invention by way of representation of exemplary embodiments and not by express limitations. It should be understood that numerous other modifications and embodiments can be devised by those skilled in the art, which fall within the scope and spirit of this disclosure.

DETAILED DESCRIPTION

As used in this Specification, the recitation of numerical ranges by endpoints includes all numbers subsumed within that range (e.g. 1 to 5 includes 1, 1.5, 2, 2.75, 3, 3.8, 4, and 5, and the like).

Unless otherwise indicated, all numbers expressing quantities or ingredients, measurement of properties and so forth used in the Specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

For the following defined terms, these definitions shall be applied for the entire Specification, including the claims, unless a different definition is provided in the claims or elsewhere in the Specification based upon a specific reference to a modification of a term used in the following Glossary:

Glossary

The words "a", "an", and "the" are used interchangeably with "at least one" to mean one or more of the elements being described.

The term "layer" refers to any material or combination of materials on or overlaying a substrate.

Words of orientation such as "atop, "on," "covering," "uppermost," "overlaying," "underlying" and the like for describing the location of various layers, refer to the relative position of a layer with respect to a horizontally-disposed, upwardly-facing substrate. It is not intended that the substrate, layers or articles encompassing the substrate and layers, should have any particular orientation in space during or after manufacture.

The term "separated by" to describe the position of a layer with respect to another layer and the substrate, or two other layers, means that the described layer is between, but not necessarily contiguous with, the other layer(s) and/or substrate.

The term "(co)polymer" or "(co)polymeric" includes homopolymers and copolymers, as well as homopolymers or copolymers that may be formed in a miscible blend, e.g., by coextrusion or by reaction, including, e.g., transesterification. The term "copolymer" includes random, block, graft, and star copolymers.

The present disclosure provides pressure sensitive adhesive foams having a foam comprising a non-syntactic foam co-polymer blend, where the non-syntactic foam blend is a hot melt formed foam. The present disclosure also provides multilayer pressure sensitive adhesive foams having the previously mentioned foam with at least one pressure sensitive adhesive layer disposed on a major surface thereof. The present disclosure also provides a pressure sensitive adhesive foam tape having a pressure sensitive adhesive foam or a multilayer pressure sensitive adhesive foam and a backing layer.

Foam

The foam of the present disclosure includes non-syntactic foam blends. Syntactic foams are foams made by incorporating hollow particles into a matrix, where "syntactic" means "put together". As used herein the term "non-syntactic foams" means essentially cellular materials where the microcellular structure has been created by stabilized gas bubbles (i.e. made from a blowing agent), within a matrix material. Blowing agent can be introduced in various ways. For example, blowing agent can be introduced as a chemical blowing agent or a physical blowing agent.

Physical blowing agents useful in the present disclosure are any naturally occurring atmospheric materials which are vapors at the temperature and pressure at which the foam exits the die. Physical blowing agent(s) may be introduced, i.e., injected into the polymer blend material as a gas, a supercritical fluid, or liquid. The physical blowing agents used will depend on the properties sought in the resulting foam articles. Other factors considered in choosing a blowing agent are its toxicity, vapor pressure profile, ease of handling, and solubility with regard to the polymeric materials used. Flammable blowing agents such as pentane, butane and other organic materials, such as hydrofluorocarbons (HFC) and hydrochlorofluorocarbons (HCFC) may be used, but non-flammable, non-toxic, non-ozone depleting blowing agents are preferred because they are easier to use, e.g., have fewer environmental concerns, etc. Suitable physical blowing agents include, e.g., carbon dioxide, nitrogen, $SF_6$, nitrous oxide, perfluorinated fluids, such as $C_2F_6$, noble gases, such as helium, argon, and xenon, air (mostly a nitrogen and oxygen blend), and blends of these materials.

Chemical blowing agents may also be used in the foam polymer blend. Suitable chemical blowing agents include a sodium bicarbonate and citric acid blend, dinitrosopentamethylenetetramine, p-toluenesulfonyl hydrazide, 4-4'-oxybis (benzenesulfonyl hydrazide, azodicarbonamide (1,1'-azobisformamide), p-toluenesulfonyl semicarbazide, 5-phenyltetrazole, 5-phenyltetrazole analogues, diisopropylhydrazodicarboxylate, 5-phenyl-3,6-dihydro-1,3,4-oxadiazin-2-one, and sodium borohydride.

The foams of the present disclosure includes blends of styrenic block copolymer (e.g., styrene-isoprene-styrene (SIS), styrene-ethylene/butylene-styrene block copolymers (SEBS)) and acrylic copolymer. Other polymers which may be added to the presently disclosed copolymer blends include, e.g., styrene resins such as polystyrene, copolymers thereof, and high impact polystyrene; polycarbonates; poly (meth)acrylics such as poly(methyl methacrylate) (PMMA); elastomers; polybutadiene; polyisoprene; polychloroprene; natural rubber; random and block copolymers of styrene and dienes (e.g., styrene-butadiene rubber (SBR)); olefinic resins, such as polyethylene, polypropylene, ethylene-propylene copolymers, ethylene-vinyl acetate copolymers, and ethylene-propylene-diene monomer rubber; amorphous polyolefins; vinyl acetate resin; polyester resins such as poly(ethylene terephthalate) (PET), poly(ethylene naphthalate) (PEN), and poly(butylene terephthalate), and amorphous polyesters. Other examples of polymers include, e.g., polystyrene-polyethylene copolymers; polyvinylcyclohexane; polyacrylonitrile; vinyl chloride resins such as polyvinyl chloride; urethane resins including thermoplastic polyurethanes; aromatic epoxies; polyamide resins such as polyamide (nylon), wholly aromatic polyamides (aramids), and amorphous polyamides; polyimides; polyetherimides; poly(ether ether ketone) (PEEK); acrylonitrile-butadiene-styrene (ABS) copolymers; fluorinated elastomers; amorphous fluoropolymers; polydimethyl siloxane; poly(phenylene sulfide); polyphenylene oxide; polyphenylene oxide blends such as polyphenylene oxide-polystyrene; copolymers containing at least one amorphous component; and mixtures thereof.

There may also be one or more additional layers of foam disposed on or above the foams of the present disclosure to give a multilayer foam structure. The additional layers of foam may be of the same composition as the foam layer or they may be selected from the materials listed above and be free of either the styrenic block copolymer or the acrylic copolymer or both. When more than one additional foam layer is employed they may be both disposed on the same side of the foam or on opposite sides of the foam. One or more surfaces of the foam and the additional foam layers may be treated to enhance the interlayer adhesion between them. Surface treatments are well known to those skilled in the art and include, for example, corona treatment, chromate treatment, exposure to ozone, exposure to flame, exposure to a high-voltage electric shock, treatment with ionizing radiation, and other oxidizing treatments through a chemical or physical procedure. Alternatively or in addition, the surfaces may have undergone a coating treatment typically with a primer.]

The elongation of the foam is typically greater than 600% and in some embodiments is from 601% to 1600% in the machine direction (MD). The "elongation" of a foam is measured herein according to the method specified in D412-06a, Test Method A, Die A.

The present disclosure provides a continuous process for generating polymer blend foams using a tandem or twin screw extrusion system. This process involves mixing two or more polymers with a physical blowing component, such as for example carbon dioxide and/or nitrogen, the blowing agent component being soluble with the polymer blends to form a melt solution. The temperature and pressure conditions in the extrusion system are selected to be sufficient to maintain the polymer blends and blowing agent as a homogeneous solution.

It has been found that by adding a physical blowing agent, the polymer blends may be more efficiently processed and foamed at lower temperatures and pressures than otherwise might be required. As the polymer melt solution exits the extruder through a shaping die, it is exposed to the much lower atmospheric pressure causing the blowing agent to expand and come out of the melt solution. This causes nucleation and cell formation resulting in foaming of the melt solution. This may result in the formation of small and uniform cells in the polymeric material.

In addition to the increase in nucleation and cell expansion, adiabatic cooling of the foam may occur as the blowing agent expands. The foams are typically fully formed at the exit of the die, when the melt solution is exposed to ambient pressure and temperature. When the melt solution exits the die and is exposed to ambient temperatures, the viscosity of the melt rapidly increases, reducing flow, which in turn arrests the growth and coalescence of the foam cells within seconds or, more typically, a fraction of a second. Upon exiting the die, the foamed polymer blend is rapidly quenched at a temperature to maintain cellular structure and retard outgassing.

In some embodiments, the foam polymer blend also includes a crosslinker system. The crosslinker system can include various crosslinkers, such as photo crosslinkers, thermal crosslinkers, and the like. Suitable polymerizable photocrosslinkers comprise a photoinitiator group and a polymerizable, ethylenically unsaturated group, such as a (meth)acryloyl group.

Photocrosslinker monomers include ethylenically unsaturated compounds having the functionality represented by the structure:

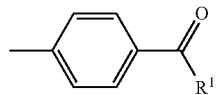

wherein $R^1$ is

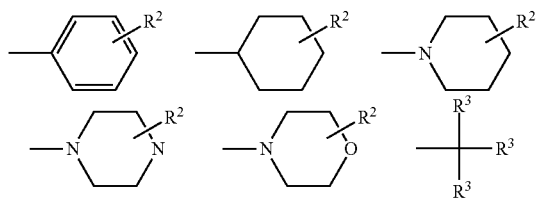

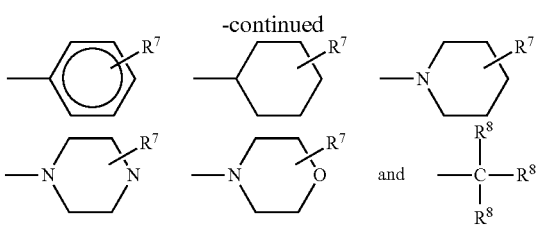

wherein $R^2$ is H or a $C_1$ to $C_6$ alkyl group,
each $R^3$ is independently a hydroxyl group, a phenyl group, a $C_1$ to $C_6$ alkyl group, or a $C_1$ to $C_6$ alkoxy group.

The photocrosslinker compounds having a photoinitiator groups may be of the general formula:

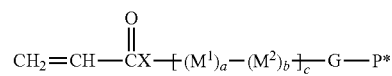

X is —O— or —NR$^4$—;
R$^4$ is H or a $C_1$ to $C_4$ alkyl group; a, b, and c are independently 0 or 1;
M$^1$ is C(R$^4$)$_2$ or Si(R$^4$)$_2$, wherein each R$^4$ is independently H or a $C_1$ to $C_4$ alkyl group;
M$^2$ is O, NR$^4$, C(O), C(O)O, C(O)NR$^4$, or OC(O)NR$^4$, wherein each R$^4$ is independently H or a $C_1$ to $C_4$ alkyl group;
G is a covalent bond, (CH$_2$)$_d$, or (CH$_2$)$_d$O where d is an integer from 1 to 4, in some embodiments from 1 to 2;
P* is a photoinitiator group, such as the radiation-sensitive α-cleaving group (supra).

In some embodiments the various compounds from which P* can be derived are aromatic ketones. Such ketones are known to be "hydrogen abstracting agents". When activated by absorption of ultraviolet light, these P* groups can act to crosslink the foamed polymer blend. Thus, P* is a moiety derived from an acetophenone, benzophenone, anthraquinone, 9-fluorene, anthrone, xanthone, thioxanthone, acridone, dibenzosuberone, benzil, or chromone. Thus the monoacryl compounds having a photoinitator group may comprise a hydrogen abstracting group. In some embodiments, preferred P* groups include those derived from an acetophenone, benzophenone, anthraquinone, thioxanthone, chromone, and benzil. Particularly preferred are benzophenone and anthraquinone.

Particularly useful polymerizable photocrosslinkers include the following compounds, or the analogous amides:

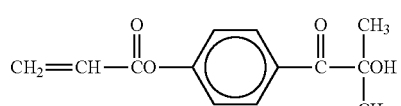

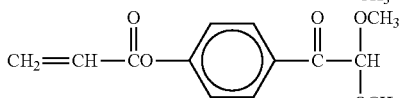

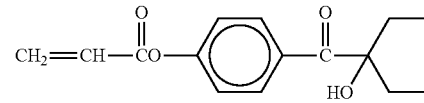

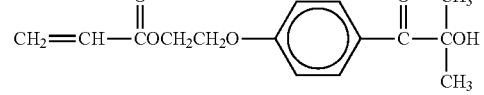

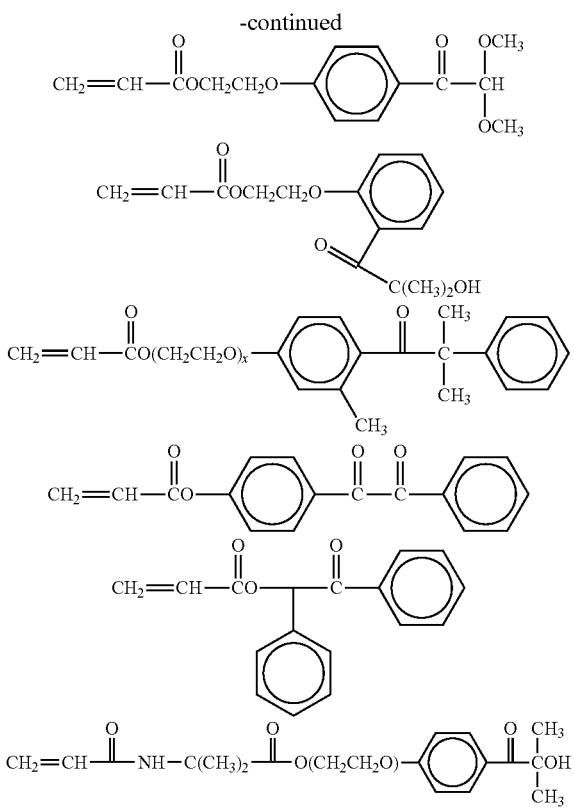

It is also possible for the crosslinker system to be composed of thermally sensitive and thermally insensitive components; for example, the crosslinkers themselves may be thermally insensitive, but the crosslinker accelerators may be thermally sensitive, or vice versa. It is also possible, for the purpose of thermally induced chemical crosslinking, for all existing thermally activatable chemical crosslinkers such as epoxidized polyester resins, acrylate resins, accelerated sulfur systems or sulfur donor systems, isocyanate systems, reactive melamine resins, formaldehyde resins and (optionally halogenated) phenol-formaldehyde resins and/or reactive phenolic-resin or diisocyanate crosslinking systems, with their corresponding activators, and also combinations thereof, to be employed.

In some embodiments, the crosslinkers are advantageously crosslinkers which are activatable at temperatures above 50° C., for example between temperatures of 100° C. to 160° C., and in some embodiments 110° C. to 140° C. The thermal excitation of the crosslinkers may take place, for example, by in-process heat (active heating, heat of shearing), IR radiation or high-energy alternating fields.

In some embodiments, the added thermal crosslinker is an isocyanate, preferably a trimerized isocyanate. In one embodiment the trimerized isocyanates are aliphatic isocyanates and/or isocyanates that are deactivated with amines. Examples of suitable isocyanates include trimerized derivatives of MDI [4,4-methylenedi(phenyl isocyanate)], HDI [1,6-hexamethylene diisocyanate] and/or IPDI [isophorone diisocyanate, 5-isocyanato-1-isocyanatomethyl-1,3,3-trimethylcyclohexane], and also trimerized-polyisocyanates and/or polyfunctional isocyanates. Reference may be made here in particular to thermal crosslinkers which are emphasized as being advantageous in WO 2006/027387 A1.

In one embodiment a crosslinker-accelerator system may be used for the thermal crosslinking of polyacrylates. For example, a system comprising at least one component containing epoxide groups as the crosslinker and at least one component which has an accelerating effect (the accelerator) on the crosslinking reaction at a temperature below the melting temperature of the polyacrylate, such as at room temperature, may be employed. An example of suitable accelerator compounds are polyfunctional amines. Use of such crosslinker-accelerator systems is especially suitable when the polyacrylate component contains functional groups that are able to enter into a crosslinking reaction with epoxide groups, such as by an addition or substitution reaction. In the course of thermal crosslinking, there is crosslinking of the functional groups on the polyacrylate with the epoxide groups of the epoxide containing component. A "component having an accelerating effect" means that the component supports the crosslinking reaction insofar as it ensures a sufficient reaction rate, whereas the crosslinking reaction in the absence of the accelerator, with selected reaction parameters, such as a temperature which lies below the melting temperature of the polyacrylate component, would not proceed at all or would proceed only with insufficient speed. The accelerator, then, ensures a substantial improvement in the kinetics of the crosslinking reaction. This may take place catalytically or stoichiometrically. Reference may be made in particular to crosslinker-accelerator systems as presented in DE 10 2007 016 950 A1.

The thickness of the PSA foam can be suitably set according typically to the strength and flexibility thereof, and the intended use of the pressure sensitive adhesive foam, as long as the total thickness of the pressure sensitive adhesive foam does not exceed 3 mm. The thickness is typically less than 0.6 mm, in some embodiments less than 0.50 mm, in some embodiments less than 0.30 mm, in some embodiments less than 0.20 mm, in some embodiments less than 0.15 mm. The PSA foam may have a single layer structure or multilayer structure.

The foam includes a polymer matrix and is characterized by a density that is lower than the density of the polymer matrix itself. In general, density reduction can be achieved in a number of ways, including through creation of gas-filled voids in the matrix (e.g., by means of a blowing agent) or inclusion of polymeric microspheres (e.g., expandable microspheres) or non-polymeric microspheres (e.g., glass microspheres). In some embodiments, the density of the presently disclosed foam is greater than 0.6 g/cm$^3$. In some embodiments, the density of the presently disclosed foam is greater than 0.7 g/cm$^3$. In some embodiments, the density of the foam is 0.3 g/cm$^3$ or greater. In other embodiments the density of the foam is between 0.3 g/cm$^3$ and 0.6 g/cm$^3$. In some embodiments, the density of the foam is between 0.3 g/cm$^3$ and 0.7 g/cm$^3$.

Cell form, cell size, thickness of cell wall and other properties of cells constituting the foams are not especially limited and can be chosen or set from among cell properties of known foam materials. For example, the cells constituting the foam may be open cells, closed cells, or any mixture of them.

The PSA foam may contain additives according to necessity. Exemplary additives include tackifiers (e.g., rosin esters, terpenes, phenols, and aliphatic, aromatic, or mixtures of aliphatic and aromatic synthetic hydrocarbon resins), surfactants, plasticizers (other than physical blowing agents), nucleating agents (e.g., talc, silica, or TiO$_2$), fillers (e.g., inorganic fillers and organic fillers), fibers, age inhibitors, antioxidants, ultraviolet-absorbers, antistatic agents, lubricants, pigments, dyes, reinforcing agents, hydrophobic or hydrophilic silica, calcium carbonate, toughening agents, flame retardants, finely ground polymeric particles (e.g., polyester, nylon, or polypropylene), stabilizers (e.g., UV stabilizers), and combinations thereof. The additives may be added in amounts sufficient to obtain the desired properties for the foam being produced. The desired properties are largely dictated by the intended application of the foam or foam article.

Nucleating agents useful in the present disclosure include any conventional nucleating agent. The amount of nucleating agent to be added depends upon the desired cell size, the selected foaming agent and the density of the foam polymer blend. Examples of inorganic nucleating agents in small particulate form include clay, talc, silica, including silica nanoparticles, nanoclays, carbon nanotubes and diatomaceous earth. Organic nucleating agents that decompose or react at a given temperature may be used. Such nucleating agents enhance the rate and degree of nucleation and may reduce the rate of diffusion from the resulting foams.

One example of an organic nucleating agent is a combination of an alkali metal salt of a polycarboxylic acid with a carbonate or bicarbonate. Examples of useful alkali metal salts of a polycarboxylic acid include the monosodium salt of 2,3-dihydroxy-butanedioic acid (i.e., sodium hydrogen tartrate), the monopotassium salt of butanedioic acid (i.e., potassium hydrogen succinate), the trisodium and tripotassium salts of 2-hydroxy-1,2,3-propanetricarboxylic acid (i.e., sodium and potassium citrate, respectively), and the disodium salt of ethanedioic acid (i.e., sodium oxalate) and polycarboxylic acid such as 2-hydroxy-1,2,3-propanetricarboxylic acid, and combinations thereof. Examples of carbonate and bicarbonate include sodium carbonate, sodium bicarbonate, potassium bicarbonate, potassium carbonate and calcium carbonate and combinations thereof. One contemplated combination is a monoalkali metal salt of a polycarboxylic acid, such as monosodium citrate or monosodium tartrate, with a carbonate or bicarbonate. It is contemplated that mixtures of different nucleating agents may be added to the foam polymer blend.

Useful surfactants in the present disclosure include polar and non-polar surfactants that can be anionic, cationic, or nonionic in nature. Surfactants lower surface tension between the polymer blend and the blowing agent, promote the nucleation of bubbles, reduce stress concentration in the thinning cell walls to stabilize the rising foam, counteract the defoaming effect of any solids in the foam, and facilitates wet-out onto a substrate. Particularly useful surfactants include AEROSOL WA-300 Surfactant (Cytec Industries, Woodland Park, N.J.) and fluorinated surfactants such as FC 430 (3M Company, St. Paul, Minn.). Surfactants may be present in the mixture, in some embodiments in an amount of no greater than about 10 parts by weight per 100 parts by weight of polymerizable monomer, in another embodiment no greater than about 5 parts by weight, and in another embodiment in the range of 0.5 to 3 parts by weight per 100 parts by weight of polymerizable monomer. Particularly useful, are fluorosurfactants, alkylphenoxypolyglycidols, and the like.

Fluorosurfactants are known and described generally in "Fluorinated Surfactants" by E. Kissa, Surfactants Science Series, Vol. 50 (Marcel Dekker, New York 1994). Fluorosurfactants including those derived from C4 perfluoroalkyl groups are also described in U.S. Pat. Nos. 4,167,639, 3,906,027, 5,342,986 and 5,502,251. In particular, fluorochemical surfactants derived from nonafluorobutanesulfonyl fluoride (PBSF) have been described more recently in U.S. Pat. No. 6,664,354 (Savu et al.), incorporated herein by reference.

In some embodiments, other useful fluorinated surfactants include acids of the formula $X(C_nF_{2n+2})COOH$, where n is an integer in the range of 3-20 and X is hydrogen or fluorine. Alkali metal salts of such acids are also effective surfactants. In addition, ammonium, amine, and quaternary ammonium salts of such acids are also useful. Examples of such compositions include ammonium perfluorobutanoate. Other useful carboxylate-type surfactants are described by the general formula $R_fCH_2CH_2SCH_2CH_2COOM$, where $R_f$=F$(CF_2CF_2)_x$, with X=1 to about 9, and M is ammonium, lithium, sodium or potassium; the lithium salt is available from E. I. du Pont de Nemours and Co. under the trade designation "ZONYL FSA" fluorinated surfactant. Phosphoric acid esters of perfluoroalkanols of the formula $(R_fCH_2CH_2O)_xP(O)(ONH_4)_y$, where $R_f$=F$(CF_2CF_2)_z$ with x=1 or 2, y=2 or 1, x+y=3, and z=1 to about 7, available under the trade designation "ZONYL FSP" fluorosurfactant. This type of surfactant is also available in the acid form (i.e. the $(ONH_4)_y$ groups are replaced by $(OH)_y$ groups) under the trade designation "ZONYL UR" fluorosurfactant, from which the ammonium, lithium, sodium and potassium salts can be prepared by neutralization with the respective bases.

Sulfuric acid esters of polyfluoroalkanols of the formula $R_fCH_2CH_2SO_3X$, where $R_f$=F$(CF_2CF_2)_y$, y=1 to about 9, X=H or $NH_4$, lithium, sodium, or potassium may also be used as fluorosurfactants. An example of such a fluorosurfactant where X is H or $NH_4$ is sold under the trade designation "ZONYL TBS" fluorosurfactant, available from E. I. du Pont de Nemours and Co.

In some embodiments, particulate additives are surface modified nanoparticles, such as those described in U.S. Pat. No. 6,586,483 (Kolb et al.), incorporated herein by reference. In such additives the individual nanoparticles have a particle diameter no greater than about 50 nanometers, and are selected from the group consisting of silica, titania, alumina, zirconia, vanadia, ceria, iron oxide, antimony oxide, tin oxide, aluminum/silica and combinations thereof. For the polymer blends, the nanoparticles are desirably functionalized with hydrophobic groups, such as isooctyl, or decyl groups. It has been found that such surface-modified nanoparticles can stabilize the foam and may comprise 0.5% to 10% by weight of the monomer composition. The nanoparticles are added to the monomer mixture.

Semi-crystalline materials may also be added to the foam polymer blend in amounts of less than 50 volume % of the mixture. Suitable semi-crystalline materials include polyethylene, polypropylene, polymethylpentene, polyisobutylene, polyolefin copolymers, Nylon 6, Nylon 66, polyester, polyester copolymers, fluoropolymers, poly vinyl acetate, poly vinyl alcohol, poly ethylene oxide, functionalized polyolefins, ethylene vinyl acetate copolymers, metal neutralized polyolefin ionomers available under the trade designation "SURLYN" from E.I. DuPont de Nemours, Wilmington, Del., polyvinylidene fluoride, polytetrafluoroethylene, polyformaldehyde, polyvinyl butyral, and copolymers having at least one semi-crystalline compound.

The PSA foam is a halogen-free foam which contains substantially no halogen compound by design. This is for the purpose of avoiding corrosion of metals. More specifically, when the pressure sensitive adhesive foam tape is used for the fixation of electric/electronic components, corrosion of metals due to the presence of halogen compounds should be avoided. Such halogen compounds are generally incorporated into pressure sensitive adhesives as halogen-containing flame retardants, halogen-containing crosslinkers, and/or halogen-containing plasticizers.

The PSA foam may be colored so as to allow the pressure sensitive adhesive foam tape to develop graphical design functions and/or optical properties such as light blocking properties and light reflecting properties. Each of the different colorants can be used alone or in combination herein.

In some embodiments, the PSA foam may be colored black by inclusion of a black color additive. Exemplary black color additives usable herein include carbon blacks (e.g., furnace black, channel black, acetylene black, thermal black, and lampblack), graphite, copper oxide, manganese dioxide, aniline black, perylene black, titanium black, cyanine black, activated carbon, ferrites (e.g., non-magnetic ferrite and magnetic ferrite), magnetite, chromium oxide, iron oxide, molybdenum disulfide, chromium complexes, multicomponent oxide-based black colorants, and anthraquinone-based organic black colorants. Among them, carbon blacks are useful, because they are available easily and inexpensively.

In some embodiments, the PSA foam may be colored white by inclusion of a white color additive. Exemplary white color additives include inorganic white colorants such as titanium oxides (e.g., titanium dioxides such as rutile titanium dioxide and anatase titanium dioxide), zinc oxide, aluminum oxide, silicon oxide, zirconium oxide, magnesium oxide, calcium oxide, tin oxide, barium oxide, cesium oxide, yttrium oxide, magnesium carbonate, calcium carbonates (precipitated calcium carbonate and heavy calcium carbonate), barium carbonate, zinc carbonate, aluminum hydroxide, calcium hydroxide, magnesium hydroxide, zinc hydroxide, aluminum silicate, magnesium silicate, calcium silicate, barium sulfate, calcium sulfate, barium stearate, zinc white, zinc sulfide, talc, silica, alumina, clay, kaolin, titanium phosphate, mica, gypsum, white carbon, diatomaceous earth, bentonite, lithopone, zeolite, sericite, and hydrated halloysite; and organic white colorants such as acrylic resin particles, styrene resin particles, urethane resin particles, amide resin particles, carbonate resin particles, silicone resin particles, urea-formaldehyde resin particles, and melamine resin particles.

Those skilled in the art can appreciate that other colors may be achieved by including other color additives in the foam. The amount of color additive is not especially limited and can be such an amount as to allow the pressure sensitive adhesive tape to have desired optical properties.

For higher adhesion, typically to the pressure sensitive adhesive layers, the surfaces of the PSA foam may have undergone one or more common surface treatments. Exemplary surface treatments include corona treatment, chromate treatment, plasma treatment, exposure to ozone, exposure to flame, exposure to a high-voltage electric shock, treatment with ionizing radiation, and other oxidizing treatments through a chemical or physical procedure. Alternatively or in addition, the surfaces may have undergone a coating treatment typically with a primer.

Pressure Sensitive Adhesive Layer

In some embodiments, a presently disclosed multilayer pressure sensitive adhesive foam includes at least one pressure sensitive adhesive layer covering or disposed on a first major surface of the PSA foam. In some embodiments, the presently disclosed multilayer pressure sensitive adhesive foam includes a second pressure sensitive adhesive layer covering or disposed on a second major surface of the PSA foam opposite the first major surface of the PSA foam. In some embodiments, the presently disclosed multilayer pressure sensitive adhesive foam includes more than one pressure sensitive adhesive layer, or even multiple pressure sensitive adhesive layers on either one of or both the major surfaces of the PSA foam. The presently disclosed multilayer pressure sensitive adhesive foam may include layers of other types of materials, such as reinforcing layers, impermeable layers, and the like, disposed between the foam and any of the pressure sensitive adhesive layers, and even between various pressure sensitive adhesive layers.

The pressure sensitive adhesive layers of the present disclosure include pressure adhesives. Pressure sensitive adhesives (PSAs) are a distinct category of adhesives and a distinct category of thermoplastics, which in dry (solvent-free) form are aggressively, and permanently, tacky at room temperature. They firmly adhere to a variety of dissimilar surfaces upon mere contact without the need of more than finger or hand pressure. Pressure sensitive adhesives require no activation by water, solvent, or heat to exert a strong adhesive holding force toward such materials as paper, cellophane, glass, wood, and metals. They are sufficiently cohesive and elastic in nature so that, despite their aggressive tackiness, they can be handled with the fingers and removed from smooth surfaces without leaving a residue. PSAs can be quantitatively described using the "Dahlquist criteria" which maintains that the elastic modulus of these materials is less than $10^6$ dynes/cm$^2$ at room temperature. See Pocius, A. V., Adhesion & Adhesives: An Introduction, Hanser Publishers, New York, N.Y., First Edition, 1997.

Exemplary pressure-sensitive adhesives useful for the presently disclosed pressure sensitive adhesive layers include, but are not limited to, acrylic pressure sensitive adhesives, rubber pressure sensitive adhesives, vinyl alkyl ether pressure sensitive adhesives, silicone pressure sensitive adhesives, polyester pressure sensitive adhesives, polyamide pressure sensitive adhesives, urethane pressure sensitive adhesives, fluorinated pressure sensitive adhesives, epoxy pressure sensitive adhesives, and other known pressure sensitive adhesives. In some embodiments, acrylic pressure sensitive adhesives are employed. Each of the different pressure sensitive adhesives can be used alone or in combination. The type (form) of pressure sensitive adhesives for use herein is not critical, and examples thereof include emulsion pressure sensitive adhesives, solvent-borne pressure sensitive adhesives, photo-polymerizable pressure sensitive adhesives and hot melt pressure sensitive adhesives (i.e., hot melt extruded pressure sensitive adhesives).

The acrylic pressure sensitive adhesives can be pressure sensitive adhesives each containing an acrylic polymer as a base polymer (base resin). Though not especially limited, the acrylic polymer can be prepared by subjecting to polymerization (or copolymerization) one or more alkyl (meth) acrylates as essential monomer components (main monomer components) and, where necessary, one or more monomers copolymerizable with the alkyl (meth)acrylates. Exemplary copolymerizable monomers include polar-group-containing monomers and multifunctional monomers. The polymerization can be performed, without limitation, according to any of known or common technique in the art, such as ultraviolet-ray (UV) polymerization, solution polymerization, or emulsion polymerization.

Alkyl (meth)acrylates for use as main monomer components of the acrylic polymer herein are alkyl (meth)acrylates each having a linear or branched-chain alkyl group, and examples thereof include alkyl (meth)acrylates whose alkyl moiety having 1 to 20 carbon atoms, such as methyl (meth) acrylates, ethyl (meth)acrylates, propyl (meth)acrylates, isopropyl (meth)acrylates, butyl (meth)acrylates, isobutyl (meth)acrylates, s-butyl (meth)acrylates, t-butyl (meth)acrylates, pentyl (meth)acrylates, isopentyl (meth)acrylates, hexyl (meth)acrylates, heptyl (meth)acrylates, octyl (meth) acrylates, 2-ethylhexyl (meth)acrylates, isooctyl (meth) acrylates, nonyl (meth)acrylates, isononyl (meth)acrylates, decyl (meth)acrylates, isodecyl (meth)acrylates, undecyl (meth)acrylates, dodecyl (meth)acrylates, tridecyl (meth) acrylates, tetradecyl (meth)acrylates, pentadecyl (meth) acrylates, hexadecyl (meth)acrylates, heptadecyl (meth) acrylates, octadecyl (meth)acrylates, nonadecyl (meth) acrylates, and eicosyl (meth)acrylates. Among them, alkyl (meth)acrylates whose alkyl moiety having 2 to 14 carbon atoms are preferred, and alkyl (meth)acrylates whose alkyl moiety having 2 to 10 carbon atoms are more preferred.

As being present as a main monomer component of the acrylic polymer, the amount of alkyl (meth)acrylates is, for example, in some embodiments 60 percent by weight or more, and in other embodiments 80 percent by weight or more, based on the total amount of monomer components for constituting the acrylic polymer. The acrylic polymer may further contain, as monomer components, one or more copolymerizable monomers such as polar-group-containing monomers and multifunctional monomers. The presence of copolymerizable monomers as monomer components may help the pressure sensitive adhesive to have an improved adhesive strength to an adherend and/or to have a higher cohesive strength. Each of the different copolymerizable monomers can be used alone or in combination.

Exemplary polar-group-containing monomers include carboxyl-containing monomers such as (meth)acrylic acids, itaconic acid, maleic acid, fumaric acid, crotonic acid, and isocrotonic acid, as well as anhydrides of them, such as maleic anhydride; hydroxyl-containing monomers including hydroxyalkyl (meth)acrylates such as hydroxyethyl (meth) acrylates, hydroxypropyl (meth)acrylates, and hydroxybutyl (meth)acrylates; amido-containing monomers such as acrylamide, methacrylamide, N,N-dimethyl(meth)acrylamides, N-methylol(meth)acrylamides, N-methoxymethyl(meth) acrylamides, and N-butoxymethyl(meth)acrylamides; amino-containing monomers such as aminoethyl (meth) acrylates, dimethylaminoethyl (meth)acrylates, and t-butylaminoethyl (meth)acrylates; glycidyl-containing monomers such as glycidyl (meth)acrylates and methylglycidyl (meth) acrylates; cyano-containing monomers such as acrylonitrile and methacrylonitrile; heterocycle-containing vinyl monomers such as N-vinyl-2-pyrrolidone, (meth)acryloylmorpholines, N-vinylpyridine, N-vinylpiperidone, N-vinylpyrimidine, N-vinylpiperazine, N-vinylpyrrole, N-vinylimidazole, and N-vinyloxazole; alkoxyalkyl (meth)acrylate monomers such as methoxyethyl (meth)acrylates and ethoxyethyl (meth)acrylates; sulfo-containing monomers such as sodium vinylsulfonate; phosphate-containing monomers such as 2-hydroxyethylacryloyl phosphate; imido-containing monomers such as cyclohexylmaleimide and isopropylmaleimide; and isocyanate-containing monomers such as 2-methacryloyloxyethyl isocyanate. Of these polar-group-containing monomers, acrylic acid and other carboxyl-containing monomers, and anhydrides of them are preferred. The amount of polar-group-containing monomers is typically 30 percent by weight or less (e.g., from 0.1 to 30 percent by weight), and preferably from 0.1 to 15 percent by weight, based on the total amount of monomer components for constituting the acrylic polymer. Polar-group-containing monomers, if used in an amount of more than 30 percent by weight, may cause the acrylic pressure-sensitive adhesive to have an excessively high cohesive strength to thereby show insufficient tackiness. Polar-group-containing monomers, if used in an excessively small amount (e.g., less than 1 percent by weight based on the total amount of monomer components for constituting the acrylic polymer) may not satisfactorily help the acrylic pressure sensitive adhesive to have a sufficient cohesive strength and to have a high shearing force.

Examples of the multifunctional monomers include hexanediol di(meth)acrylates, butanediol di(meth)acrylates, (poly)ethylene glycol di(meth)acrylates, (poly)propylene glycol di(meth)acrylates, neopentyl glycol di(meth)acrylates, pentaerythritol di(meth)acrylates, pentaerythritol tri (meth)acrylates, dipentaerythritol hexa(meth)acrylates, trimethyloipropane tri(meth)acrylates, tetramethylolmethane tri(meth)acrylates, allyl (meth)acrylates, vinyl (meth) acrylates, divinylbenzene, epoxy acrylates, polyester acrylates, and urethane acrylates. The amount of multifunctional monomers is typically 2 percent by weight or less (e.g., from 0.01 to 2 percent by weight) and preferably 0.02 to 1 percent by weight, based on the total amount of monomer components for constituting the acrylic polymer. Multifunctional monomers, if used in an amount of more than 2 percent by weight of the total amount of monomer components for constituting the acrylic polymer, may cause the acrylic pressure sensitive adhesive to have an excessively high cohesive strength, resulting in insufficient tackiness. Multifunctional monomers, if used in an excessively small amount (e.g., less than 0.01 percent by weight of the total amount of monomer components for constituting the acrylic polymer), may not satisfactorily help the acrylic pressure-sensitive adhesive to have a sufficient cohesive strength.

In addition to the polar-group-containing monomers and multifunctional monomers, exemplary copolymerizable monomers usable herein further include vinyl esters such as vinyl acetate and vinyl propionate; aromatic vinyl compounds such as styrene and vinyltoluene; olefins or dienes such as ethylene, butadiene, isoprene, and isobutylene; vinyl ethers such as vinyl alkyl ethers; and vinyl chloride. Exemplary copolymerizable monomers further include (meth) acrylates each having an alicyclic hydrocarbon group, such as cyclopentyl (meth)acrylates, cyclohexyl (meth)acrylates, and isobornyl (meth)acrylates.

The pressure sensitive adhesive layers may contain suitable additives according to the intended use. Exemplary additives usable herein include tackifiers (e.g., rosin esters, terpenes, phenols, and aliphatic, aromatic, or mixtures of aliphatic and aromatic synthetic hydrocarbon resins), cross-linking agents (e.g., polyisocyanate compounds, silicone compounds, epoxy compounds, and alkyl-etherified melamine compounds), surfactants, plasticizers (other than physical blowing agents), nucleating agents (e.g., talc, silica, or $TiO_2$), fillers (e.g., inorganic fillers and organic fillers), fibers, age inhibitors, antioxidants, ultraviolet-absorbers, antistatic agents, lubricants, pigments, dyes, reinforcing agents, hydrophobic or hydrophilic silica, calcium carbonate, toughening agents, flame retardants, finely ground polymeric particles (e.g., polyester, nylon, or polypropylene), stabilizers (e.g., UV stabilizers), colorants (e.g., dyestuffs and pigments such as carbon blacks), and combinations thereof. Such additives may be chosen as appropriate according to the type of the pressure-sensitive adhesive.

A resin composition (pressure sensitive, adhesive composition) for the formation of the pressure sensitive adhesive layers can be prepared by mixing the base polymer, additives, and other components according to a known technique, which additives and other components may be incorporated according to the intended use.

Though not limited, the pressure sensitive adhesive layers may be formed, for example, by applying the pressure sensitive adhesive composition to a suitable support (carrier)

such as a release liner or base material, to form the layers. Where necessary, any other process such as heating and/or drying may be conducted.

The total thickness of at least one of the pressure sensitive adhesive layers (the total thickness of the pressure sensitive adhesive layers arranged on or above one or both sides of the PSA foam) is generally from about 5 to about 200 μm, in some embodiments from 10 to 170 μm, in other embodiments from 20 to 150 μm, and in other embodiments from 25 to 100 μm, though it may vary depending on the type of the pressure sensitive adhesive layer and is not critical, as long as the total thickness of the multilayer pressure sensitive adhesive foam does not exceed 0.6 mm, and in some embodiments does not exceed 0.51 mm. The respective thicknesses of the pressure sensitive adhesive layers arranged on or above both sides of the foam may be the same as or different from each other. Though not critical, the thickness of one pressure sensitive adhesive layer is generally from 5 to 100 μm, in some embodiments from 15 to 75 μm, and in other embodiments from 20 to 65 μm. Each of the pressure sensitive adhesive layers may independently have a single-layer structure or multilayer structure.

Backing Layer

Presently disclosed pressure sensitive adhesive foam tapes also include, in some embodiments, at least one backing layer. The backing layer can be disposed along one of the major surfaces of the PSA foam and/or the pressure sensitive adhesive layer(s). The backing layer may be composed of any suitable backing material such as paper, plastic film, cloth, or metal foil. In some embodiments, suitable materials for the backing layer include, for example, paper including both flat or smooth paper as well as textured paper such as crepe paper, natural or synthetic polymer films, nonwovens made from natural and/or synthetic fibers and combinations thereof, fabric reinforced polymer films, fiber or yarn reinforced polymer films or nonwovens, and multiple layer laminated constructions.

The presently disclosed pressure sensitive adhesive foam tape may have a removable release liner which protects the single layer or multilayer pressure sensitive adhesive foam until a liner used therewith is removed. In some embodiments, the presently disclosed pressure sensitive adhesive foam tapes have layers of additional adhesives, primers, easy release materials, filaments, printing, and the like, depending on the application for which the pressure sensitive adhesive foam tape is being made.

Applications

Applications include various applications in which it is necessary to bond to surfaces having irregular topographies, such as non-flat surfaces as well as applications in which shock impact damping and/or vibration damping are important performance criteria. For example, FIG. 2 disclosed herein shows tensile elongation and tensile drop resistance data for pressure sensitive adhesive foam tapes made according to the present disclosure. Some applications include, but are not limited to, lens bonding on mobile handheld devices, electronics bonding, conformable masking tape applications, automotive dash trim bonding, solar panel bonding, window mounting and sealing, box sealing applications, personal care products, gasketing materials, protective coverings, labels, anti-slip products, insulation products, and reduced tear strength products (i.e. bandages, medical tapes, and the like). In addition, pressure sensitive adhesive foams that possess high elongation characteristics may exhibit stretch-release properties that would permit the foams to be more easily removed from a substrate by pulling and stretching it. This capability enables the clean and easy removal of the foams if they have been inaccurately applied to a complex substrate. This reworkability aspect enhances the value of such foams in applications including the display screens of mobile hand held devices and larger LCD displays.

Articles contemplated in the present disclosure include any articles that are useful in any of these types of applications.

Following are various, non-limiting exemplary embodiments and combinations of embodiments:

Embodiment 1

A pressure sensitive adhesive foam comprising a foam comprising a non-syntactic foam blend of styrenic block copolymer and acrylic copolymer wherein the pressure-sensitive adhesive foam has an elongation of greater than 600%, wherein the non-syntactic foam blend is a hot melt formed foam.

Embodiment 2

The pressure sensitive adhesive foam of Embodiment 1 further comprising a total thickness of less than 0.51 mm (25 mils).

Embodiment 3

The pressure sensitive adhesive foam of any of the preceding Embodiments wherein the non-syntactic foam blend has a density of greater than 0.6 $g/cm^3$.

Embodiment 4

The pressure sensitive adhesive foam of any of Embodiments 1 to 2 wherein the non-syntactic foam blend has a density of greater than 0.7 $g/cm^3$.

Embodiment 5

The pressure sensitive adhesive foam of any of the preceding Embodiments wherein the foam is a halogen-free foam containing substantially no halogen compound by design.

Embodiment 6

The pressure sensitive adhesive foam according to any of Embodiments 1 to 5 wherein the foam further comprises a color additive.

Embodiment 7

A multilayer pressure sensitive adhesive foam comprising the pressure sensitive adhesive foam of any of the preceding Embodiments and further comprising at least one pressure sensitive adhesive layer on a first major surface of the foam.

Embodiment 8

The multilayer pressure sensitive adhesive foam of Embodiment 7 further comprising a second pressure sensitive adhesive layer on a second major surface of the foam opposite the first major surface of the foam.

Embodiment 9

A pressure sensitive adhesive foam tape comprising the pressure sensitive adhesive foam or multilayer pressure sensitive adhesive foam of any of the preceding Embodiments and further comprising a backing layer.

Embodiment 10

The multi layer pressure sensitive adhesive foam according to Embodiments 7 or 8 or the pressure sensitive adhesive foam tape according to Embodiment 9 wherein each pressure sensitive adhesive layer is independently selected from a pressure sensitive adhesive comprising at least one of an acrylic co-polymer, a styrenic block co-polymer, and blends thereof.

Embodiment 11

The multi layer pressure sensitive adhesive foam or pressure sensitive adhesive foam tape according to Embodiment 10 wherein the pressure sensitive adhesive further comprises a tackifier.

Embodiment 12

The multi layer pressure sensitive adhesive foam according to Embodiments 7, 8, 10 or 11 or the pressure sensitive adhesive foam tape of claim 9 wherein at least one of the pressure sensitive adhesive layers further comprises a color additive.

Embodiment 13

The pressure sensitive adhesive foam of Embodiment 6 or the multi layer pressure sensitive adhesive foam or pressure sensitive adhesive foam tape according to claim 12 wherein the color additive is a black color additive.

Embodiment 14

An article comprising the pressure sensitive adhesive foam, multilayer pressure sensitive adhesive foam, or pressure sensitive adhesive foam tape of any of the preceding Embodiments.

Exemplary embodiments of the present disclosure have been described above and are further illustrated below by way of the following Examples, which are not to be construed in any way as imposing limitations upon the scope of the present disclosure. On the contrary, it is to be clearly understood that resort may be had to various other embodiments, modifications, and equivalents thereof which, after reading the description herein, may suggest themselves to those skilled in the art without departing from the spirit of the present disclosure and/or the scope of the appended claims.

EXAMPLES

The following examples are intended to illustrate exemplary embodiments within the scope of this disclosure. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Materials Used

The following terminology, abbreviations, and trade names are used in the Examples:

Materials

| | | |
|---|---|---|
| 2EHA | 2-ethylhexyl acrylate | |
| AA | Acrylic acid | |
| VA-24 | Ethylene/vinyl acetate copolymer film having a thickness of 0.063 mm (0.0025 in.), available as VA-24 from Pliant Corp. of Evansville, IN | |
| I-651 | IRGACURE 651, a photoinitiator available from Ciba Specialty Chemicals, Tarrytown, NY | |
| I-1076 | IRGANOX 1076, an antioxidant, available from Ciba Specialty Chemicals, Tarrytown, NY | |
| I-1726 | IRGANOX 1726, an antioxidant, available from Ciba Specialty Chemicals, Tarrytown, NY | |
| HDDA | 1,6-hexanediol diacrylate | |
| D1161 | KRATON D1161-PT, pellets of a styrene-isoprene-styrene block copolymer having a styrene content of 15%, available from Kraton Performance Polymers, Inc., Houston, TX | |
| D1340 | KRATON D1340-KT, a dissimilar arm, styrene-isoprene, star polymer with 9.2% styrene content and made according to U.S. Pat. No. 5,393,787, the subject matter of which is hereby incorporated herein in its entirety, obtained from Kraton Performance Polymers, Inc., Houston, TX | |
| REM Black | REMAFIN Black EVA, pellets of an ethylene vinyl acetate copolymer containing 40 wt % carbon black, available as Product code 1000110S from Clariant Corp., Holden, MA) | |
| TALCRON | TALCRON MP12-50, talc powder, available from Brenntag Specialties, Incorporated, South Plainfield, NJ | |
| F85 | FORAL 85, a tackifier resin based on a glyercol ester of a highly hydrogenated wood rosin, available from Pinova, Inc., Brunswick, GA | |
| 3M-9458 | a tackified acrylic adhesive transfer tape having a thickness of 25 micrometers (0.001 inch) on a 3.2 mil thick densified kraft paper release liner, available from 3M Company, St. Paul, MN | |
| WT Plus | WINGTACK PLUS, an aromatically modified C-5 hydrocarbon resin, available from Cray Valley USA, LLC, Exton, PA | |
| PE Foam 1 | 84020W, a 0.20 mm (0.008 inch) thick double-coated polyethylene foam tape, commercially available from DIC Corp., Tokyo, Japan | |
| PE Foam 2 | 57120B, a 0.20 mm (0.008 inch) thick double-coated polyethylene foam tape, commercially available from Nitto Denko Corp., Osaka, Japan | |

-continued

| | |
|---|---|
| Syntactic Foam Tape | 3M ™ VHB ™ 4914 Tape, a 0.25 mm (0.010 inch) thick double-coated acrylic syntactic foam tape, commercially available from 3M Company |
| PMMA | Poly(methyl methacrylate), available as PLEXIGLASS MC from Aeromat Plastics, Inc., Burnsville, MN |
| CR90 | 3M ™ Crystalline Automotive Window Film CR90, available from 3M Company, St. Paul, MN |
| AR2 | Poly(methyl methacrylate) having an abrasion resistant coating on it, available as ACRYLITE ARII, from Aeromat Plastics, Inc., Burnsville, MN |
| HP PET | Hostaphan 3SAB polyester film having a thickness of 0.051 mm (0.002 inches), available from Mitsubishi Polyester Film, Inc., Greer, SC |

Test Methods
Compression Drop Test

A window film, CR90, was laminated by hand using a rubber roller to a PMMA panel measuring 30.5 by 12.7 by 0.95 cm (2 by 5 by 0.38 inches) and weighing 33 grams after the panel was sprayed clean using compressed gas. A plastic hand applicator was used to remove any entrapped air bubbles. The window film had the same dimensions as the PMMA panel and had a weight of 0.5 grams. The surface of the window film, which acted as a hardcoat layer on the PMMA panel, was washed twice with isopropanol. The surface energy of the cleaned window film was measured using a portable goniometer and found to be approximately 36-37 dyne/cm. Two strips of an adhesive foam measuring 2 mm by 51 mm were applied to an aluminum panel measuring 5.1 by 10.2 by 0.79 cm (2 by 4 by 0.312 inches) weighing 122 grams in such a manner that the foam strips were placed lengthwise across the width of the aluminum panel and were each 24.4 mm (0.96 inches) from the ends of the panel. Next, the aluminum panel was positioned on the window film surface of the PMMA panel such that the aluminum panel was centered on the window film and the foam strips bonded the aluminum panel to the surface of the window film. A 9 kg (20 lb.) weight was placed on top of the bonded article (aluminum panel on bottom) for 2 minutes then removed after which the bonded article was allowed to dwell for 18 hours at 23° C. and 50% relative humidity (RH). The bonded article was then evaluated for drop resistance in a compression mode using a drop tester (DT 202, available from Shinyei Corporation of America, New York, N.Y.) and a horizontal orientation of the bonded article with the PMMA substrate on the bottom. The bonded article was dropped 200 cm onto a 9.5 cm thick cement tile. Three samples were tested, the number of drops to failure recorded for each, and the average number of drops to failure was reported. In addition, the failure mode was recorded: PO for pop-off (i.e., the foam strip de-bonded from the hardcoat/window film) or FS for foam split (i.e., the foam split).

Tensile Drop Test—Room Temperature Conditioning

A panel of ACRYLITE AR11 measuring 5.1 by 10.2 by 0.30 cm (2 by 4 by 0.118 inches) and weighing 17.6 grams was washed three times with isopropanol. The surface energy of the washed surface was measured using a portable goniometer and found to be approximately 39-40 dyne/cm. Two strips of an adhesive foam measuring 2 mm by 51 mm were applied lengthwise across the width of the underside cavity of a custom made aluminum test fixture having a weight of 143 grams as shown in FIG. 1 such that they were 11.5 mm from the end walls of the cavity. The AR11 panel was centered within the cavity and in contact with the adhesive foam strips. The bonded article was then positioned with the cavity facing upward and a 4 kg (8.8 lb.) weight was placed on the exposed surface of the AR11 panel for 15 seconds after which it was removed and the bonded article was allowed to dwell for 24 hours at 23° C. and 50% RH. The bonded article was then evaluated for drop resistance in a tensile mode using a drop tester (DT 202, available from Shinyei Corporation of America, New York, N.Y.) and a horizontal orientation of the bonded article with the AR11 substrate facing downward. The bonded article was dropped 70 cm onto a 1.2 cm thick steel plate. Three samples were tested, the number of drops to failure recorded for each, and the average number of drops to failure was reported. In addition, the failure mode was recorded: PO for pop-off (i.e., the foam strip de-bonded from the AR11 panel) or FS for foam split (i.e., the foam split).

Tensile Drop Test—Elevated Temperature Conditioning

The same procedure as described for "Tensile Drop Test—Room Temperature Conditioning" was employed but with the following modification. The bonded article was allowed to dwell for 18 hours at 65° C. and 80% RH followed by 1 hour at 23° C. and 50% RH before drop resistance was evaluated.

Preparation of Pressure Sensitive Adhesive Foam Tape Samples

Samples of pressure sensitive adhesive foam tape for peel testing were prepared by laminating the pressure sensitive adhesive foam onto HP PET using a hand held rubber roller, except where noted. The resulting pressure sensitive adhesive foam tape was conditioned at 23° C. and 50% RH for at least 18 hours before evaluating for peel adhesion.

90° Angle Peel Adhesion Strength (Room Temperature) to Polypropylene (PP)

A 12.5 mm (0.5 inch) wide strip of pressure sensitive adhesive foam tape was laminated onto a polypropylene (PP) panels having a thickness of 0.95 mm (0.38 in.) using a 2.0 kg (4.5 lb) rubber roller to give a bonded article. After a dwell time of 24 hours at 23° C. and 50% RH a 90° angle peel test was performed using a Model 3M90 Slip/Peel Tester (manufactured by Instrumentors, Inc., Strongville, Ohio) at 30.5 cm/min. (12 in./min), with data collected and averaged over 10 seconds, according to the test method ASTM Designation D3330/D330M-04. The observed mode of failure was clean peel (CP) for all samples.

90° Angle Peel Adhesion Strength (Elevated Temperature) to PP

The same procedure as described for "90° Angle Peel Adhesion Strength (Room Temperature) to PP" was employed but with the following modification. Instead of dwelling 24 hours at 23° C. the bonded article was aged for 7 days at 70° C. in a forced air oven before peel adhesion was evaluated.

90° Angle Peel Adhesion Strength (Room Temperature) to Stainless Steel (SS)

The same procedure as described for "90° Angle Peel Adhesion Strength (Room Temperature) to PP" was employed but with the following modification. A 0.13 mm (0.005 in.) thick anodized aluminum foil was used in place of HP PET. The mode of failure was noted and recorded using the following designations: FS: foam split; CP: clean peel; AL: interfacial adhesion failure between the skin adhesive and the anodized aluminum backing.

90° Angle Peel Adhesion Strength (Elevated Temperature) to SS

The same procedure as described for "90° Angle Peel Adhesion Strength (Room Temperature) to SS" was employed but with the following modification. Instead of dwelling 24 hours at 23° C. the bonded article was aged for 7 days at 70° C. in a forced air oven before peel adhesion was evaluated.

Tensile Strength and Elongation at Break

Elongation at break and ultimate tensile strength were measured according to ASTM Designation D412-06a, Test Method A with Die A dumbbell shaped samples using a tensile tester equipped with a 2.27 kg (5 lb) load cell. The rate of grip separation was 50.8 cm/min. (20 in/min.). Three samples were tested, and the average value was reported.

Examples

Preparation of Acrylic Copolymer 1

Two sheets of VA-24 were heat sealed on the lateral edges and the bottom to form a rectangular pouch on a liquid form, fill, and seal machine. The pouch was filled with a pressure sensitive adhesive precursor composition having 94 parts 2EHA, 6 parts AA, 0.15 parts of I-651 per 100 parts of total monomer ("phr"), 0.4 phr I-1076, and 0.006 phr HDDA. The filled package was then heat sealed at the top in the cross direction through the monomer to form a pouch measuring 13.4 cm by 4.3 cm by about 0.4 cm thick containing 27 grams (g) of composition. The pouch was then placed in a water bath that was maintained at between about 16° C. and 32° C. (61° F. and 90° F.) and exposed to ultraviolet radiation (supplied by lamps having about 90% of their emissions between 300 and 400 nanometers (nm), and a peak emission at 351 nm) at an intensity of 4.55 mW/cm$^2$ for 21 minutes Preparation of Foam 1

A 30 mm diameter co-rotating twin screw having 12 zones, each corresponding to one twelfth of the length of the screw, and a length to diameter ratio of 36:1 was operated at 300 rpm using the following temperature profile: Zones 1-2: 400° F. (204° C.); Zones 3-4: 350° F. (177° C.); Zones 5-12: 325° F. (163° C.). Two different styrene-based block copolymers (D1161 and D1340) were fed by gravimetric feeders into zone 1 of the twin screw extruder at a rate of 28 g/min. (3.7 lb/hr). REM black was fed by a volumetric feeder into zone 1 at rate of 0.9 g/min. TALCRON was also fed by a volumetric feeder into zone 1 at a rate of 0.76 g/min. I-1726 was fed into zone 2 by a hot melt supply unit at a rate of 0.5 g/min. Pouches of Acrylic Copolymer 1 were fed into a 2 inch (5.1 cm) single packer which masticated the pouches and fed them into zone 4 of the twin screw extruder at a rate of 18.9 g/min (2.5 lb/hr). F85 was fed at a rate of 18.9 g/min into zone 6 of the extruder from a hot melt supply unit set at 300° F. (149° C.). A physical blowing agent, comprising a premixed gas blend of nitrogen and oxygen (70:30/w:w) was injected into zone 8 at 350 psi (2.4 MPa) using a pressure regulator. The melt mixture was passed from the extruder into a polymer melt pump set at 300° F. (149° C.) and having a throughput rate of 2.92 cc/revolution and on through a heated (149° C.) neck tube into a rotary rod die set to 300° F. (149° C.) from which it was deposited onto a silicone-coated, polyester release liner. As the melt mixture exited the die, the physical blowing agent in the melt mixture expanded to provide a foamed article. The thickness and density of the resulting foamed article are given in Table 2.

Preparation of Foam 2 and Foam 3

Foam 2 and Foam 3 were prepared as described for Foam 1 with the following modifications. The amounts of materials were varied as shown in Table 1, and I-1076 was used in place of I-1726. The thickness and density of the resulting foamed articles are given in Table 2.

Preparation of Foam 4

Foam 4 was prepared as described for Foam 1 with the following modifications. D1340 was omitted. The feed rate of D1161 was increased to 56.8 g/min. (7.5 lb/hr). In addition, WT Plus was employed in place of F85, and was added at a rate of 30.3 g/min A foamed article was obtained having the thickness and density as shown in Table 2. The foamed article was then irradiated on its exposed foam surface side by electron-beam radiation at an accelerating voltage of 220 kVolts and a dose of 6 MRad to provide a pressure sensitive adhesive foam.

Preparation of Foam 5

Foam 5 was prepared as described for Foam 4 with the following modifications. The amounts of materials were varied as shown in Table 1, and the WT Plus was added at a rate of 37.8 g/min. A foamed article was obtained having the thickness and density as shown in Table 2. The foamed article was then irradiated by electron-beam radiation at an accelerating voltage of 220 kVolts and a dose of 6 MRad to provide a pressure sensitive adhesive foam.

TABLE 1

Formulations of Pressure Sensitive Adhesive Foams

| | Amounts (wt. %) | | | | |
|---|---|---|---|---|---|
| Material | Foam 1 | Foam 2 | Foam 3 | Foam 4 | Foam 5 |
| KD1161 | 29.2 | 26.1 | 26.1 | 52.5 | 49.1 |
| D1340 | 29.2 | 26.1 | 26.1 | none | none |
| Acrylic Copolymer 1 | 19.7 | 17.4 | 17.4 | 17.5 | 16.4 |
| F85 | 19.7 | 27.8 | 27.8 | none | none |
| REM Black | 0.9 | 1.4 | 1.4 | 0.8 | 0.8% |
| TALCRON | 0.8 | 0.7 | 0.7 | 0.7 | 0.7 |
| I-1726 | 0.5 | none | none | 0.5 | 0.4 |
| I-1076 | none | 0.5 | 0.5 | none | none |
| WT Plus | none | none | none | 28.0 | 32.7 |

Example 1

3M-9458 adhesive film was laminated onto both sides of Foam 1 by hand using a rubber roller to give a multilayer foam article. The release liner was removed from one side and the multilayer pressure sensitive adhesive foam article was then irradiated on its exposed surface side by electron-beam radiation at an accelerating voltage of 220 kVolts and a dose of 6 MRad to give a multilayer pressure sensitive adhesive foam having a total thickness of 0.15 mm (0.006 inches). The multilayer pressure sensitive adhesive foam article obtained was evaluated for drop resistance, peel adhesion, and tensile properties. The results are shown in Table 2.

Example 2

A multilayer pressure sensitive adhesive foam article was prepared as described for Example 1 with the following modifications. Foam 2 was used in place of Foam 1 and the resulting multilayer pressure sensitive adhesive foam article was irradiated by electron-beam radiation at an accelerating voltage of 300 kVolts and a dose of 8.5 MRad to give a multilayer pressure sensitive adhesive foam article having a total thickness of 0.20 mm (0.008 inches). The multilayer pressure sensitive adhesive foam article obtained was evaluated for drop resistance, peel adhesion, and tensile properties. The results are shown in Table 2.

Example 3

A multilayer pressure sensitive adhesive foam was prepared as described for Example 2 with the following modification. Foam 3 was used in place of Foam 2 to give a multilayer pressure sensitive adhesive foam article having a total thickness of 0.30 mm (0.012 inches). The multilayer pressure sensitive adhesive foam article obtained was evaluated for drop resistance, peel adhesion, and tensile properties. The results are shown in Table 2.

Example 4

Foam 4, prepared as described above, was used without further modification. The pressure sensitive adhesive foam obtained was evaluated for drop resistance, peel adhesion, and tensile properties. The results are shown in Table 2.

Example 5

Foam 5, prepared as described above, was used without further modification. The pressure sensitive adhesive foam obtained was evaluated for drop resistance, peel adhesion, and tensile properties. The results are shown in Table 2.

Comparative Example 1

PE Foam 1 was used as Comparative Example 1. It was evaluated for drop resistance, peel adhesion, and tensile properties. The results are shown in Table 2.

Comparative Example 2

PE Foam 2 was used as Comparative Example 2. It was evaluated for drop resistance, peel adhesion, and tensile properties. The results are shown in Table 2.

Comparative Example 3

Syntactic Foam Tape was used as Comparative Example 3. It was evaluated for drop resistance, peel adhesion, and tensile properties. The results are shown in Table 2.

Figure 2:
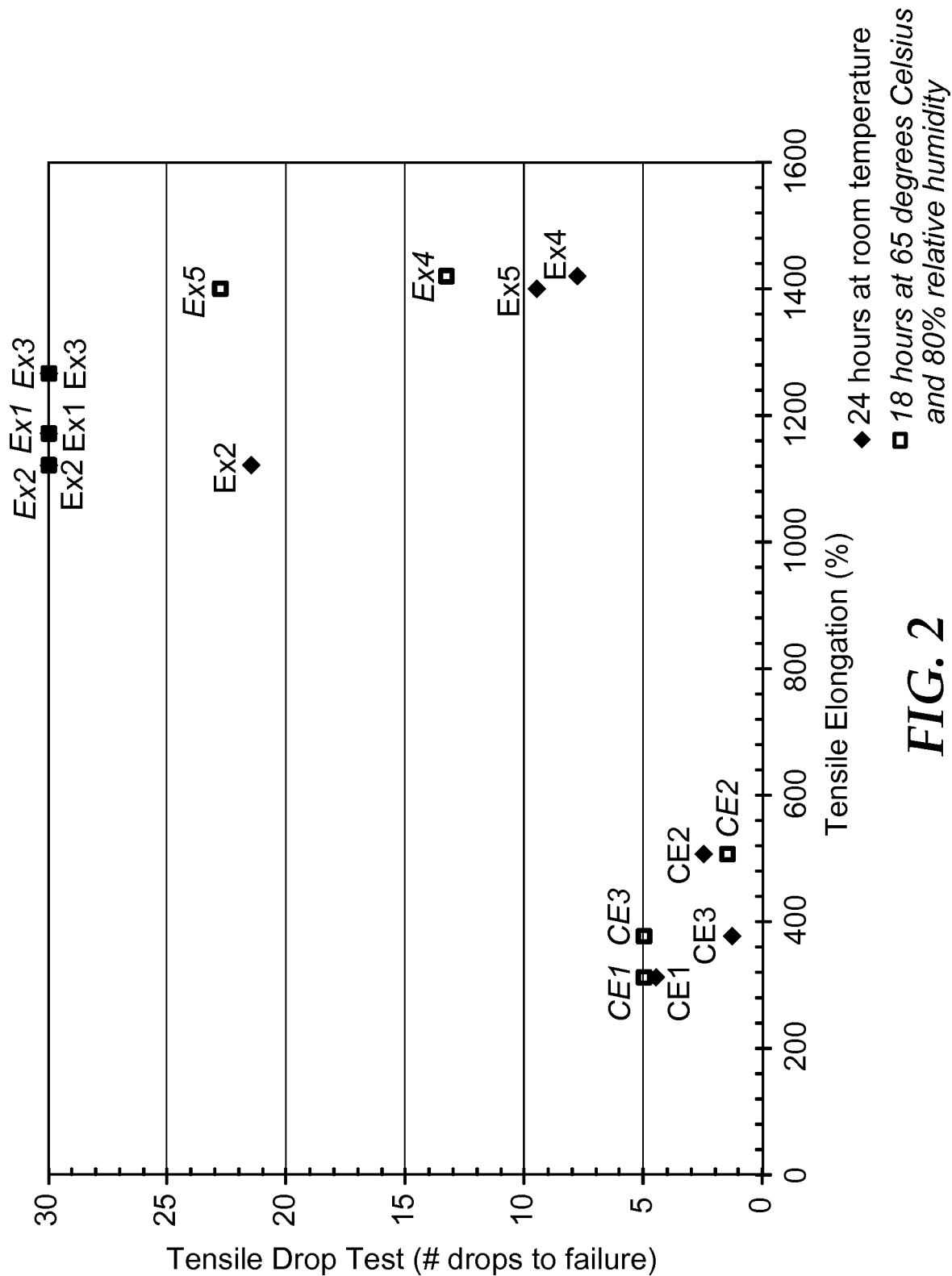
FIG. 2 is graphical representation of data related to tensile elongation and tensile drop resistance for Examples 1-5 and Comparative Examples 1-3 at two different test conditions.

As can be seen in Table 2 and FIG. 2 greater tensile elongation properties generally correlated with greater drop resistance.

TABLE 2

Test Results

| Ex. | Foam Density (g/cc) | Foam Thickness mm (in.) | Total Thickness mm (in.) | Compression Drop Test # drops and failure mode | Tensile Drop Test # drops and failure mode RT | Aged | Peel Adhesion N/cm (oz/in.) and failure mode PP (RT) | PP (Aged) | SS (RT) | SS S(Aged) | Tensile Elongation (%) | Tensile Strength MPa (psi) |
|---|---|---|---|---|---|---|---|---|---|---|---|---|
| 1 | 0.76 | 0.10 (0.004) | 0.15 (0.006) | 28 FS | >30 | >30 | 6.17 (56.4) CP | 5.06 (46.2) CP | 10.87 (99.3) CP | 10.53 (96.2) CP | 1095 | 1.53 (222) |
| 2 | 0.76 | 0.15 (0.006) | 0.20 (0.008) | >30 | >30 | >30 | 4.81 (43.9) CP | 4.68 (42.8) CP | 11.22 (102.5) CP | 10.09 (92.2) CP | 1339 | 2.57 (373) |
| 3 | 0.77 | 0.20 (0.008) | 0.25 (0.010) | >30 | >30 | >30 | 5.75 (52.5) CP | 5.43 (49.6) CP | 10.79 (98.6) CP | 11.39 (104.1) CP | 1169 | 2.30 (334) |
| 4 | 0.86 | 0.15 (0.006) | 0.15 (0.006) | 2 PO | 7.8 PO | 13.3 PO | 9.34 (85.3) CP | 7.79 (71.2) CP | 7.08 (90.1) CP | 11.13 (134.1) CP | >1420 | >3.72 (>540) |
| 5 | 0.74 | 0.20 (0.008) | 0.20 (0.008) | 14 PO | 9.5 PO | 22.8 PO | 6.55 (59.8) CP | 5.93 (54.2) CP | 7.08 (64.7) CP | 11.13 (101.7) CP | 1400 | 2.70 (391) |
| CE1 | ND | ND | 0.20 (0.008) | 7 FS | 4.5 FS | 5 FS | 4.39 (40.1) CP | 4.13 (37.7) CP | 10.79 (98.6) CP | 18.07 (165.1) FS | 311 | 5.56 (806) |
| CE2 | ND | ND | 0.20 (0.008) | 5.3 FS | 2.5 FS | 1.5 FS | 8.42 (76.9) CP | 6.92 (63.2) CP | 13.17 (120.3) FS | 13.31 (121.6) FS | 506 | 3.25 (471) |
| CE3 | ND | ND | 0.10 (0.004) | 2 PO | 1.3 PO | 5 PO | 0.86 (7.9) CP | 1.07 (9.8) CP | 15.18 (138.7) AL | 20.83 (190.3) FS | 376 | 1.25 (182) |

ND: not determined

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. Furthermore, all publications, published patent applications and issued patents referenced herein are incorporated by reference in their entirety to the same extent as if each individual publication or patent was specifically and individually indicated to be incorporated by reference. Various exemplary embodiments have been described. These and other embodiments are within the scope of the following listing of disclosed embodiments.

What is claimed is:

1. A pressure sensitive adhesive foam comprising a non-syntactic foam blend of styrenic block copolymer and acrylic copolymer wherein the pressure-sensitive adhesive foam has an elongation of greater than 600%, wherein the non-syntactic foam blend is a hot melt formed foam, wherein the styrenic block copolymer comprises one or more of styrene-isoprene-styrene (SIS) block copolymer and styrene-ethylene/butylene-styrene block copolymer; and wherein the pressure sensitive adhesive foam does not contain surfactants and does not contain surface-modified nanoparticles.

2. The pressure sensitive adhesive foam of claim 1 further comprising a total thickness of less than 0.51 mm (25 mils).

3. The pressure sensitive adhesive foam of claim 1 wherein the non-syntactic foam blend has a density of greater than 0.6 g/cm$^3$.

4. The pressure sensitive adhesive foam of claim 1 wherein the non-syntactic foam blend has a density of greater than 0.7 g/cm$^3$.

5. The pressure sensitive adhesive foam of claim 1 wherein the foam is a halogen-free foam containing substantially no halogen compound by design.

6. An article comprising the pressure sensitive adhesive foam of claim 1.

7. The pressure sensitive adhesive foam of claim 1 wherein the styrenic block copolymer comprises styrene-isoprene-styrene (SIS) block copolymer.

8. The pressure sensitive adhesive foam according to claim 1 wherein the foam further comprises a color additive.

9. The pressure sensitive adhesive foam of claim 8 wherein the color additive is a black color additive.

10. A multilayer pressure sensitive adhesive foam comprising the pressure sensitive adhesive foam of claim 1 and further comprising at least one pressure sensitive adhesive layer on a first major surface of the foam.

11. The multilayer pressure sensitive adhesive foam of claim 10 further comprising a second pressure sensitive adhesive layer on a second major surface of the foam opposite the first major surface of the foam.

12. The multilayer pressure sensitive adhesive foam according to claim 10 wherein each pressure sensitive adhesive layer is independently selected from a pressure sensitive adhesive comprising at least one of an acrylic co-polymer, a styrenic block co-polymer, and blends thereof.

13. The multilayer pressure sensitive adhesive foam according to claim 12 wherein the pressure sensitive adhesive further comprises a tackifier.

14. The multilayer pressure sensitive adhesive foam according to claim 10 wherein at least one of the pressure sensitive adhesive layers further comprises a color additive.

15. The multilayer pressure sensitive adhesive according to claim 14 wherein the color additive is a black color additive.

16. A pressure sensitive adhesive foam tape comprising the pressure sensitive adhesive foam of claim 1 and further comprising a backing layer.

17. The pressure sensitive adhesive foam tape of claim 16 wherein at least one of the pressure sensitive adhesive layers further comprises a color additive.

18. The pressure sensitive adhesive foam tape of claim 17 wherein the color additive is a black color additive.

* * * * *

UNITED STATES PATENT AND TRADEMARK OFFICE
CERTIFICATE OF CORRECTION

PATENT NO. : 10,626,268 B2
APPLICATION NO. : 14/391426
DATED : April 21, 2020
INVENTOR(S) : Andrew Satrijo Page 1 of 2

It is certified that error appears in the above-identified patent and that said Letters Patent is hereby corrected as shown below:

On the Title Page

Column 1
(87) PCT Pub. No.:, Delete "WO2013/155536" and insert -- WO2013/155362 --, therefor.

In the Specification

Column 1
Lines 18 and 20, Delete "compressability" and insert -- compressibility --, therefor.

Column 4
Line 67, Delete "primer.]" and insert -- primer. --, therefor.

Column 6
Line 41, Delete "monoacryl" and insert -- monocryl --, therefor.
Line 41, Delete "photoinitator" and insert -- photoinitiator --, therefor.

Column 14
Line 11, Delete "trimethyloipropane" and insert -- trimethylolpropane --, therefor.

Column 18
Line 60, Delete "glyercol" and insert -- glycerol --, therefor.

Column 20
Line 49, Delete "Strongville," and insert -- Strongsville, --, therefor.

Column 21
Line 39, Delete "minutes" and insert -- minutes. --, therefor.

Signed and Sealed this
Eighteenth Day of August, 2020

Andrei Iancu
*Director of the United States Patent and Trademark Office*

In the Claims

Column 26
Line 23, In Claim 15, after "adhesive" insert -- foam --.